United States Patent Office 2,861,103
Patented Nov. 18, 1958

2,861,103

MANUFACTURE OF THIOPHOSGENE AND ALPHA-HALOSULFIDES

George E. Lukes, Irvington, and Joseph T. Rabatin, Nyack, N. Y., assignors to Stauffer Chemical Company, a corporation of Delaware No Drawing. Application January 11, 1957
Serial No. 633,535

5 Claims. (Cl. 260—543)

This invention relates to a process for the simultaneous manufacture of thiophosgene and monochlorodimethyl sulfide and other alpha-halosulfides. These chemicals are highly reactive and are thus useful in the synthesis of other compounds, but heretofore it has not been practical to make them in large quantity and the price has remained so high that it has discouraged full utilization of their properties.

Thiophosgene is a mobile red liquid, boiling at 73.5° C., having a very disagreeable and penetrating odor. In the past, it has been prepared in relatively low yields from perchloromethylmercaptan.

Monochlorodimethyl sulfide is a colorless liquid having a boiling point of 107° C. and it has previously been prepared from dimethyl sulfide and thionyl chloride or other sulfur-containing chlorides. Other organic sulfides having an alpha halogen atom are useful in synthesis work. However, the methods heretofore employed for the synthesis of these compounds have not been fully satisfactory and are more costly.

It is an object of the present invention to make thiophosgene and monochlorodimethyl sulfide, as well as other alpha halogenated organic sulfides, in high yields, utilizing relatively inexpensive starting materials.

In accordance with the present invention, it has been found that dimethyl sulfide and similar organic sulfides will react with perchloromethylmercaptan when the two compounds are heated together to produce thiophosgene and an alpha-monochloro sulfide. Preferably, the two starting materials are used in stoichiometric quantities, although slight departures from these proportions may be used. Although the reaction goes quite readily without a catalyst, yields can be improved by the use of such catalysts as iodine, ferric chloride, aluminum chloride, copper chloride and antimony trichloride. The reaction goes readily at temperatures of from 25° to 250° C. and the range 120° to 160° C. is optimum. The products begin to form immediately but ordinarily the reaction is allowed to go for from 1 to 6 hours, or longer, preferably under reflux.

The reaction of the present invention may be represented as follows:

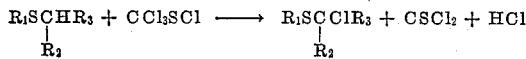

wherein $R_1$ may be any organic radical, and $R_2$ and $R_3$ any organic radical or hydrogen.

To prepare the compounds, it is only necessary to combine the starting materials, with or without a catalyst, and heat them in a vessel which is equipped with a reflux condenser. Ordinarily the reaction commences at room temperature, but the mixture is preferably heated to 120° C. or higher, with the heating continuing throughout the reaction.

By using an inert solvent such as chlorinated biphenyl, or the heels from a previous reaction, the reactants can be added continuously.

The following non-limiting examples illustrate preferred methods of carrying out the process.

Example 1.—About 1.6 moles of dimethyl sulfide, 2.0 moles of perchloromethyl mercaptan and 8 grams of iodine were charged to a distilling flask which was fitted with a 1" diameter, 4 ft. high distilling column packed with ⅛" glass helices. The column was electrically heated and a water cooled distilling head was used to condense the vapors and return liquid reflux to the column. After the reactants were charged to the flask, the reaction mixture was refluxed for 75 minutes during which time hydrogen chloride was liberated as a reaction by-product. After refluxing, overhead product was withdrawn from the column using a 5 to 1 reflux ratio. The infrared analyses of the distillation cuts taken were as follows:

| Cut No. | Boiling Range, °C. | Weight of Cut, grams | Percent Thiophosgene by I. R. Analysis |
|---|---|---|---|
| 1 | 73–75 | 115 | 91.5 |
| 2 | 75–81 | 63 | 49.0 |
| 3 | 81–86 | 14 | 28.6 |

The yield of thiophosgene was 61% based on perchloromethyl mercaptan charged and 76% based on dimethyl sulfide charged.

Example 2.—About 250 cc. of chlorinated diphenyl, as inert solvent, and 8 grams of iodine were charged to an agitated reactor equipped with dropping funnels, and product condenser. The solvent-catalyst mixture was then heated to 120° C. Four moles of perchloromethylmercaptan and 4 moles of dimethyl sulfide were then added in separate streams at the rate of 0.016 mole/minute of each reactant. The reactor temperature was maintained at a temperature of 120–130° C. during the addition. On completion of the addition of the reagents, 90% by weight of the reaction product mixture was charged to the distillation equipment described in Example 1. A reflux ratio of 5:1 was employed in separating thiophosgene from the reaction product. The infrared analyses of the cuts were as follows:

| Cut No. | Boiling Range, °C. | Weight of Cut, grams | Percent Thiophosgene by I. R. Analysis |
|---|---|---|---|
| 1 | 47–70 | 55 | 82.7 |
| 2 | 70–76 | 223 | 100 |
| 3 | 76–103 | 41 | 97. |

The yield of thiophosgene was 74% based on the perchloromethylmercaptan or the dimethyl sulfide charged to the reactor.

Example 3.—248 parts of dimethyl sulfide and 784 parts of perchloromethyl mercaptan were added simultaneously with stirring from two dropping funnels in approximately equimolar ratios to a mixture of 250 parts of chlorinated diphenyl and 8 parts of iodine which had been previously heated to 160° C. The reaction started immediately; hydrogen chloride was evolved and a red liquid distilled from the flask and was condensed. The red liquid was distilled in a packed column. A fraction boiling at 70°–76° C. was collected. Infrared analysis of this fraction showed 259 parts of thiophosgene or a yield of 56% based on the dimethyl sulfide charged to the reactor. Monochlorodimethyl sulfide was collected at 103–107° C. at 760 mm. Yield was 155 parts or 40% based on the dimethyl sulfide charged to the reactor.

Example 4.—A cold mixture of 160 parts ethyl methyl sulfide and 392 parts of perchloromethyl mercaptan was added slowly to 8.4 parts of iodine. An exothermic reaction started immediately with evolution of hydrogen chloride. The mixture was stirred and maintained at 45° C. by external cooling throughout the addition period. After 1 hour the reaction mixture was heated to 96° C. and a red liquid was distilled from the flask. 5 parts of distillate were collected in the receiver. Another 37 parts of the liquid was collected in the Dry-Ice trap. Infrared analysis showed that thiophosgene was present in both fractions.

The residue in the reaction flask was distilled at reduced pressure. A fraction boiling at 87°/70 mm. and with the composition 19.32% carbon, 2.42% hydrogen, 20.2% chlorine and 43.05% sulfur was separated.

*Example 5.*—A mixture of 152 parts ethyl methyl sulfide, 380 parts perchloromethyl mercaptan and 8 parts iodine was stirred at room temperature. An exothermic reaction started immediately and mixture began to reflux (65° C.) with evolution of hydrogen chloride. When the reaction subsided the mixture was heated to 155° C. and a red liquid was distilled from the flask. 70 parts of distillate were collected in the receiver. Another 50 parts of liquid were collected in the Dry-Ice trap. Infrared analysis showed that thiophosgene was present in both fractions.

*Example 6.*—A mixture of 180 parts diethyl sulfide, 380 parts perchloromethyl mercaptan and 8 parts iodine was stirred at room temperature and then heated to 110° C. A reaction started at 110° C. and hydrogen chloride was evolved. At 140° a red liquid was distilled from the flask. 20 parts of distillate were collected in the receiver. Another 20 parts of liquid was collected in the Dry-Ice trap. Infrared analysis showed that thiophosgene was present in both fractions.

*Example 7.*—A mixture of 250 parts methyl phenyl sulfide, 380 parts perchloromethyl mercaptan and 8 parts of iodine was stirred at room temperature and then heated to 100° C. A reaction started at 100° C., and hydrogen chloride was evolved. At 160° C., a red liquid was distilled from the flask through an unpacked column and condensed. 35 parts of distillate were collected in the reaction. Another 20 parts of liquid were collected in the Dry-Ice trap. Infrared analysis showed that thiophosgene was present in both fractions.

*Example 8.*—To a distilling flask equipped with heating mantle and fitted to a 1" diameter, 1 ft. high packed column with distilling head were added 2 moles of perchloromethyl mercaptan, 2 moles of dimethyl disulfide and 8 grams of anhydrous ferric chloride. The reactants were refluxed for 3 hours at which time there was no further gas evolution. During the reflux period the temperature in the reaction flask was increased slowly from room temperature to 130° C. Overhead product was then removed from the column, and the distillation cuts were analyzed by infrared. The results were as follows:

| Cut No. | Boiling Range, ° C. | Weight of Cut, grams | Percent Thiophosgene by I. R. Analysis |
|---|---|---|---|
| 1 | 72-92 | 198 | 60.5. |
| 2 | 92-105 | 71 | 17. |
| 3 | 105 | 16 | Negligible. |

The yield of thiophosgene was 58% based on the perchloromethyl mercaptan or the dimethyl sulfide charged to the reactor.

We claim:

1. The process of making thiophosgene and an alpha-chlorosulfide comprising reacting together perchloromethyl mercaptan and a compound of the formula

wherein $R_1$ is selected from the group consisting of lower alkyl and aryl, and $R_2$ and $R_3$ are selected from the group consisting of lower alkyl radicals and hydrogen.

2. The process of making thiophosgene and monochlorodimethyl sulfide comprising reacting together perchloromethyl mercaptan and dimethyl sulfide in about stoichiometric proportions.

3. The process of claim 1 wherein iodine is employed as a catalyst.

4. The process of claim 1 wherein ferric chloride is employed as a catalyst.

5. The process of claim 1 wherein the reactants are added continuously to a heated inert solvent.

No references cited.